(No Model.)
W. P. BONHAM.
HARROW.
No. 363,274. Patented May 17, 1887.
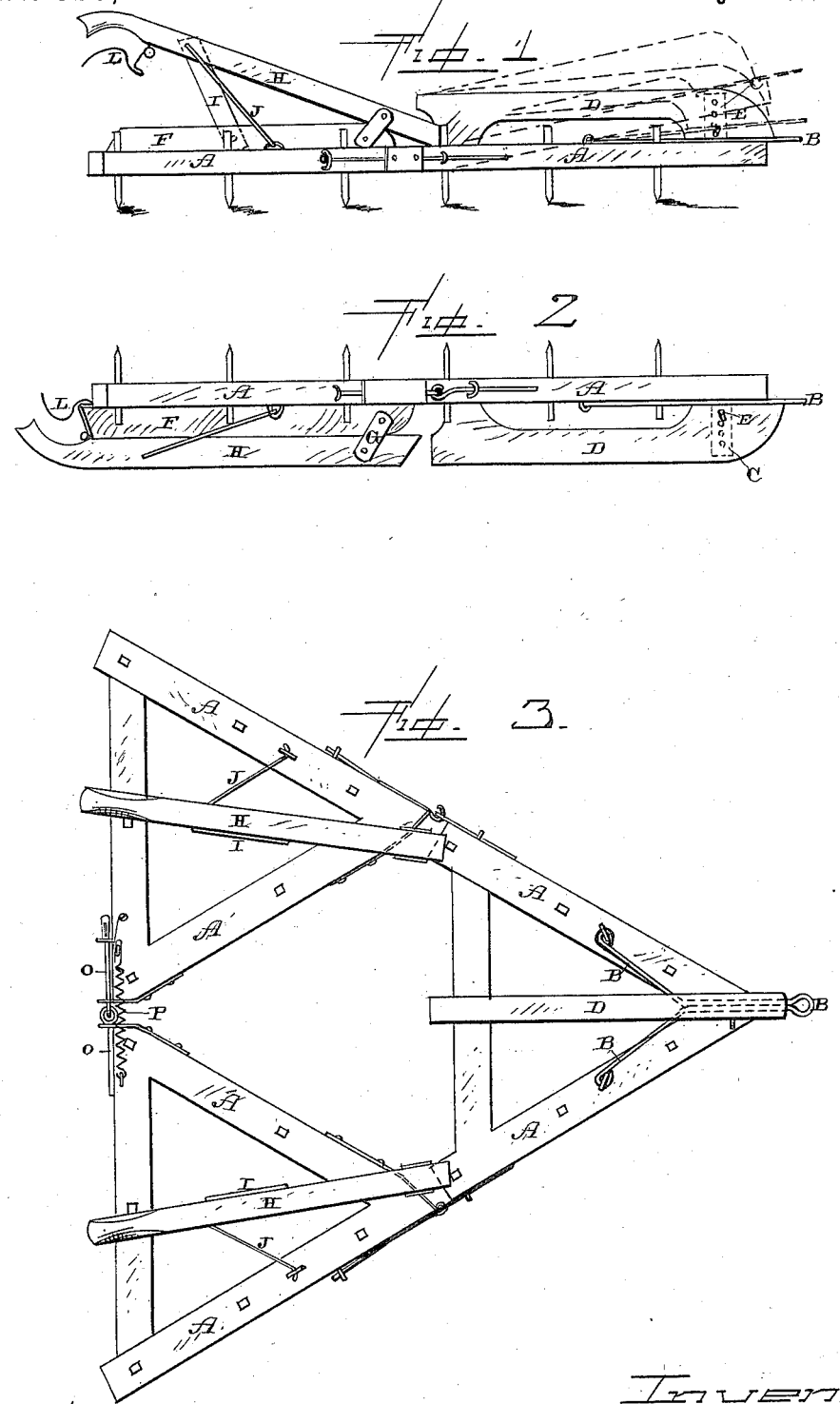
Witnesses:
L. F. Gardner
Edm. P. Ellis.
Inventor:
W. P. Bonham,
per F. A. Lehmann, Atty.

UNITED STATES PATENT OFFICE.

WILLIAM P. BONHAM, OF MARION, VIRGINIA.

HARROW.

SPECIFICATION forming part of Letters Patent No. 363,274, dated May 17, 1887.

Application filed March 15, 1887. Serial No. 230,977. (No model.)

*To all whom it may concern:*

Be it known that I, WILLIAM P. BONHAM, of Marion, in the county of Smyth and State of Virginia, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists in, first, the combination of a suitable number of sections, which are loosely connected together, with the pivoted handles, which are pivoted upon the rear sections and can be moved forward and upward until their front ends strike against the rear teeth on the front section, and thus cause the front section to be raised upward, so that its teeth can be freed from obstructions; second, the combination of a suitable number of sections, which are loosely connected together, with combined runners and handles, whereby when the harrow is reversed the handles become converted into runners for the purpose of transporting the harrow from place to place; third, the combination of a suitable number of sections, the front one of which is provided with a runner upon its top, and which runner is adjustable at its front end, and the clevis, which is pivoted upon the top of the section, and which is adjustable with the runner, so as to accommodate horses of different heights; fourth, in the arrangement and combination of parts, which will be more fully described hereinafter, and pointed out in the claims.

The objects of my invention are to provide the harrow, which is formed of a number of A-shaped sections, with combined handles and runners, which serve to both guide the sections while in use as a harrow and to raise the front section upward, so as to allow its teeth to be freed from obstructions, and which handles, when the harrow is reversed, become converted into runners, so as to raise the sections above the ground while being transferred from one place to another; to connect the inner rear corners of the sections together by means of a spring, so as to return them to position as quickly as possible after one or both have been raised upward by obstructions over which it is passing, and to make the clevis vertically adjustable, so as to adapt the harrow to be drawn with ease by different-sized animals.

Figure 1 is a side elevation of a harrow embodying my invention, showing the harrow in use. Fig. 2 is a similar view showing the harrow inverted and ready for transportation. Fig. 3 is a plan view of the harrow complete.

A represents the three A-shaped sections, which constitute the harrow, and which are loosely connected together by suitable couplings at their corners, as shown. Each one of these sections is provided with suitable harrow-teeth in the usual manner. Upon the top of the front section is pivoted the clevis B, which consists of a bent rod, as shown, and which has its rear ends pivoted half-way back upon the top of the section. The pivotal points are placed back a suitable distance, in order to allow the front end of the clevis a free vertical adjustment upon the guide C, so as to adapt the harrow to be drawn with ease by both large and small horses. Loosely secured upon the top of this front section is the runner D, which has a suitable recess formed in its front end and perforations E made through its side, so that a locking-pin can be passed through one of the perforations E in the runner and one of the perforations in the guide C, and thus raise the front end of the runner upward to any desired distance. In whatever position the front end of this runner D is adjusted, it serves to regulate the height to which the front end of the clevis B shall be raised, for this clevis strikes against the under side of the runner and is regulated in its movements thereby. When the harrow is inverted, as shown in Fig. 2, for the purpose of being moved from one place to another, the pin is withdrawn from the hole and the front end of the runner is moved down upon the guide, thus forcing the clevis tightly against the top of the section. When, however, the harrow is in use, the front end of the runner D will be raised upon the guide C as high as it is desired that the clevis shall be raised to accommodate the height of the animal that is pulling the harrow.

Upon the top of each of the rear sections is secured a bar, F, and connected to this bar by short links G at the front end are the combined handles and runners H. These combined runners and handles are connected near their rear ends by a link, I, which extends from the bar F to the handles, and by a pivoted rod, J, which extends from the top of the outside beam to the rear end of the handle. Each of these combined handles and runners is provided with spring-catches L, which engage with the rear ends of the bars F when the combined handles and runners are depressed, for the purpose of holding them rigidly in position. When it is desired to guide the harrow while in use, the rear ends of the handles are raised, as shown, and then the rear end of either one of the sections can be raised for the purpose of freeing its teeth from obstructions of all kinds, and for the purpose of lifting the sections over any obstruction which may be in the way. When these handles are raised at their rear ends, their front ends move forward sufficiently far to bear against the rear corner teeth of the front section. When it is desired to raise the front section, so as to free its teeth from obstructions of all kinds, the handles are forced forward at their front ends until a sufficient pressure is brought against the two corner teeth of the front section to pry or raise its front end upward, as shown in dotted lines, so as to allow all of the trash and rubbish which have been caught in the teeth to be cleared away. When the harrow is to be transported from one place to another, these two handles are closed down upon the tops of the bars F and held in place by means of the spring-catches L, and then when the harrow is inverted the sections are raised entirely upon the runners D H, and can be drawn from place to place without the teeth coming in contact with the ground.

The rear inner corners of the two rear sections are connected together by the two rods O, which have their inner ends formed into suitable hooks, one of which is held at its inner end by means of a suitable key, which is passed through a hole in its end, and when this key is removed this rod can be moved outward, and thus the sections detached from each other. In order to return the rear ends of these two sections into line with each other after having been raised upward by means of obstructions of any kind which may be in their way, they are connected together by a suitable spring, P, which serves to return either one or both of the sections to position again after having been moved as quickly as possible. By the use of this spring, in case the inner corner of either or both of the sections should encounter any obstruction and be forced or raised out of line with each other, they are drawn back to position again, so that no part of the ground is left unharrowed. One end of this spring is made detachable, so that in case it is desired to separate the sections it can be readily done. The couplings by which the sections are united together being very flexible, the sections follow every inequality of the ground, and thus every part is thoroughly harrowed.

Having thus described my invention, I claim—

1. The combination of the front section, having the runner D placed upon its top, and which runner is made adjustable at its front end by means of a suitable guide, with the clevis, which is made vertically adjustable at its front end, substantially as shown.

2. The combination of the rear sections, with the combined handles and runners H, which are loosely connected thereto, with the front section, which is provided with a runner upon its top, substantially as described.

3. The combination of the rear sections, the bars F, secured thereon, and the combined runners and handles H, connected to the rods, substantially as set forth.

4. The combination of the rear sections, the bars F, secured upon their tops, the connecting-links or fastening devices, the handles H, and the spring-catches L, substantially as specified.

5. The combination of the front section, provided with the runner D upon its top and provided with suitable harrow-teeth, with the rear sections, which are connected thereto, and the combined runners and handles H, which are connected by suitable links with a bar placed upon tops of the sections, the front ends of the handles being adapted to be forced forward and made to catch against the rear teeth of the front section for the purpose of raising the front end of the section, substantially as shown.

In testimony whereof I affix my signature in presence of two witnesses.

WILLIAM P. BONHAM.

Witnesses:
JNO. R. SEXTON,
J. H. GOLLEHON.